(12) United States Patent
Hatanaka et al.

(10) Patent No.: US 11,638,957 B2
(45) Date of Patent: May 2, 2023

(54) ADDITIVE MANUFACTURED OBJECT

(71) Applicant: MITSUBISHI HEAVY INDUSTRIES, LTD., Tokyo (JP)

(72) Inventors: Masaya Hatanaka, Tokyo (JP); Masashi Kitamura, Tokyo (JP); Hiroyuki Nakaharai, Tokyo (JP); Koichi Tanimoto, Tokyo (JP); Nobuhide Hara, Tokyo (JP); Takuo Oda, Tokyo (JP); Yoichi Uefuji, Tokyo (JP); Shunsaku Eguchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/674,202

(22) Filed: Feb. 17, 2022

(65) Prior Publication Data
US 2022/0281001 A1    Sep. 8, 2022

(30) Foreign Application Priority Data
Mar. 4, 2021 (JP) .............................. JP2021-034597

(51) Int. Cl.
  *B33Y 80/00*  (2015.01)
  *B22F 5/00*  (2006.01)
  *F28D 1/02*  (2006.01)

(52) U.S. Cl.
  CPC .............. *B22F 5/00* (2013.01); *B33Y 80/00* (2014.12); *F28D 1/02* (2013.01); *F28D 2001/026* (2013.01)

(58) Field of Classification Search
  None
  See application file for complete search history.

(56) References Cited

U.S. PATENT DOCUMENTS

| 10,744,565 B2 | 8/2020 | Okazaki |
| 2006/0151160 A1* | 7/2006 | Take ................ F28F 1/022 165/110 |
| 2018/0164052 A1 | 6/2018 | Nakamura et al. |
| 2019/0195572 A1* | 6/2019 | Jo .................... F28F 1/126 |
| 2020/0124362 A1 | 4/2020 | Nakamura et al. |

FOREIGN PATENT DOCUMENTS

| JP | 3406896 | 5/2003 |
| JP | 2017-036906 | 2/2017 |
| JP | 6405028 | 10/2018 |
| JP | 2021-038894 | 3/2021 |

OTHER PUBLICATIONS

Brett Smith, Why is Surface Finish Important in Engineering Applications?, Feb. 19, 2019 (Year: 2019).*

* cited by examiner

*Primary Examiner* — Mary I Omori
(74) *Attorney, Agent, or Firm* — Wenderoth, Lind & Ponack, L.L.P.

(57) ABSTRACT

An additive manufactured object according to at least one embodiment of the present disclosure includes a first base portion made of a metal, and a plurality of wall portions each having a thickness thinner than the first base portion and provided upright on the first base portion so as to be aligned in a wall thickness direction. A first end portion of each of the wall portions is connected to the first base portion via a first connection portion having a width greater than the thickness of each of the wall portions in the wall thickness direction.

3 Claims, 10 Drawing Sheets

ADDITIVE MANUFACTURED OBJECT

CROSS-REFERENCE TO RELATED APPLICATIONS

This application claims the benefit of priority to Japanese Patent Application Number 2021-034597 filed on Mar. 4, 2021. The entire contents of the above-identified application are hereby incorporated by reference.

TECHNICAL FIELD

The present disclosure relates to an additive manufactured object.

RELATED ART

In recent years, an additive manufacturing method for obtaining a three-dimensional object by additive manufacturing of a metal has been used as a method of manufacturing various metal products. For example, in an additive manufacturing method using a powder bed method, a three-dimensional additive manufactured object is formed by repeatedly melting and solidifying a metal powder used as a raw material powder layered in layers, by irradiating the metal powder with an energy beam such as a light beam or an electron beam (for example, refer to JP 6405028 B).

For example, a heat exchange core of a heat exchanger can be formed as an additive manufactured object by an additive manufacturing method using a powder bed method. Various types of heat exchangers exist, and examples thereof include one with a configuration in which a heat exchange core formed from a laminate of plates is housed on an inner side of a casing having a tubular shape. For example, a heat exchange core for performing heat exchange between two fluids includes a plurality of flow path groups extending along a flow direction of the fluids (see JP 3406896 B).

SUMMARY

For example, in the heat exchange cores described in JP 6405028 B and JP 3406896 B, the thinner the wall portions separating the flow paths, the shorter the heat transfer distance, improving the heat transfer efficiency.

Forming such a heat exchange core by an additive manufacturing method using a powder bed method can pose a risk of insufficient melting at the intersection between the relatively thin wall portion described above and a part connected to the relatively thin wall portion and having a relatively large volume. That is, if, for example, the relatively thin wall portion is layered and fabricated onto the part having a relatively large volume after fabricating said part, there is a risk of insufficient melting of the metal powder because the heat introduced to a powder bed by the energy beam escapes.

It is desirable to suppress manufacturing defects of an additive manufactured object that are caused by such insufficient melting.

In view of the circumstances described above, an object of at least one embodiment of the present disclosure is to improve the quality of an additive manufactured object.

(1) An additive manufactured object according to at least one embodiment of the present disclosure includes: a first base portion made of a metal; and a plurality of wall portions each having a thickness thinner than the first base portion and provided upright on the first base portion so as to be aligned in a wall thickness direction, a first end portion of each of the wall portions being connected to the first base portion via a first connection portion having a width greater than the thickness of each of the wall portions in the wall thickness direction.

According to at least one embodiment of the present disclosure, the quality of an additive manufactured object can be improved.

BRIEF DESCRIPTION OF DRAWINGS

The disclosure will be described with reference to the accompanying drawings, wherein like numbers reference like elements.

DESCRIPTION OF EMBODIMENTS

Figure 1:
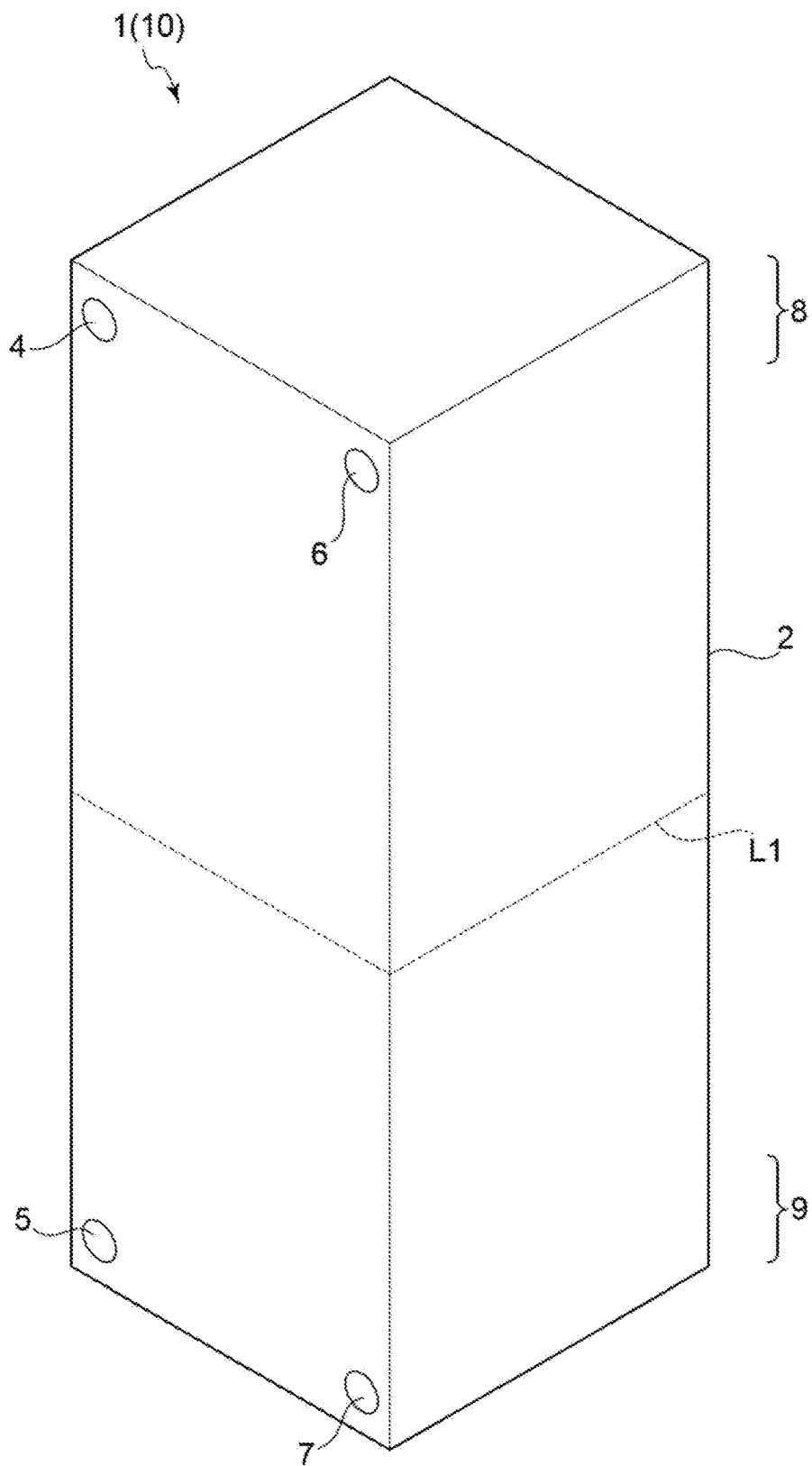
FIG. 1 is a schematic perspective view of a heat exchange core of a heat exchanger according to one embodiment.

Hereinafter, some embodiments of the present disclosure will be described with reference to the accompanying drawings. However, dimensions, materials, shapes, relative arrangements, or the like of components described in the embodiments or in the drawings are not intended to limit the scope of the present disclosure thereto, and are merely illustrative examples.

For instance, an expression indicating relative or absolute arrangement such as "in a direction", "along a direction", "parallel", "orthogonal", "centered", "concentric" or "coaxial" shall not be construed as indicating only the arrangement in a strict literal sense, but also includes a state where the arrangement is relatively displaced by a tolerance, or by an angle or a distance within a range in which the same function can be achieved.

For instance, an expression indicating an equal state such as "same", "equal", or "uniform" shall not be construed as indicating only a state in which features are strictly equal, but also includes a state in which there is a tolerance or a difference within a range in which the same function can be achieved.

Further, for instance, an expression indicating a shape such as a rectangular shape or a tube shape shall not be construed as only being a geometrically strict shape, but also includes a shape with unevenness, chamfered corners, or the like within a range in which the same effect can be achieved.

On the other hand, an expression such as "comprise", "include", "have", "contain" or "constitute" is not intended to be exclusive of other constituent elements.

First, an outline of a heat exchanger will be described as an example of an additive manufactured object according to some embodiments.

FIG. 1 is a schematic perspective view of a heat exchange core 1 of a heat exchanger according to one embodiment. The heat exchange core 1 illustrated in FIG. 1 is used in a heat exchanger 10 in which heat is exchanged between a first fluid and a second fluid, the heat exchange core 1 being provided with a main body portion 2. Here, each of the first and second fluids may be a liquid or a gas, and typically the temperatures of the first and second fluids are different. Although not limited, the main body portion 2 can have a cuboid shape.

The heat exchange core 1 illustrated in FIG. 1 may be used, for example, in a state where the heat exchanger 10 is attached to a case (not illustrated). In addition, the heat exchange core 1 illustrated in FIG. 1 may be used without being attached to the case but by being installed on a frame or supported on a pipe (not illustrated) that is connected to the heat exchange core 1. In this case, the heat exchange core 1 itself illustrated in FIG. 1 functions as the heat exchanger 10.

Figure 2:
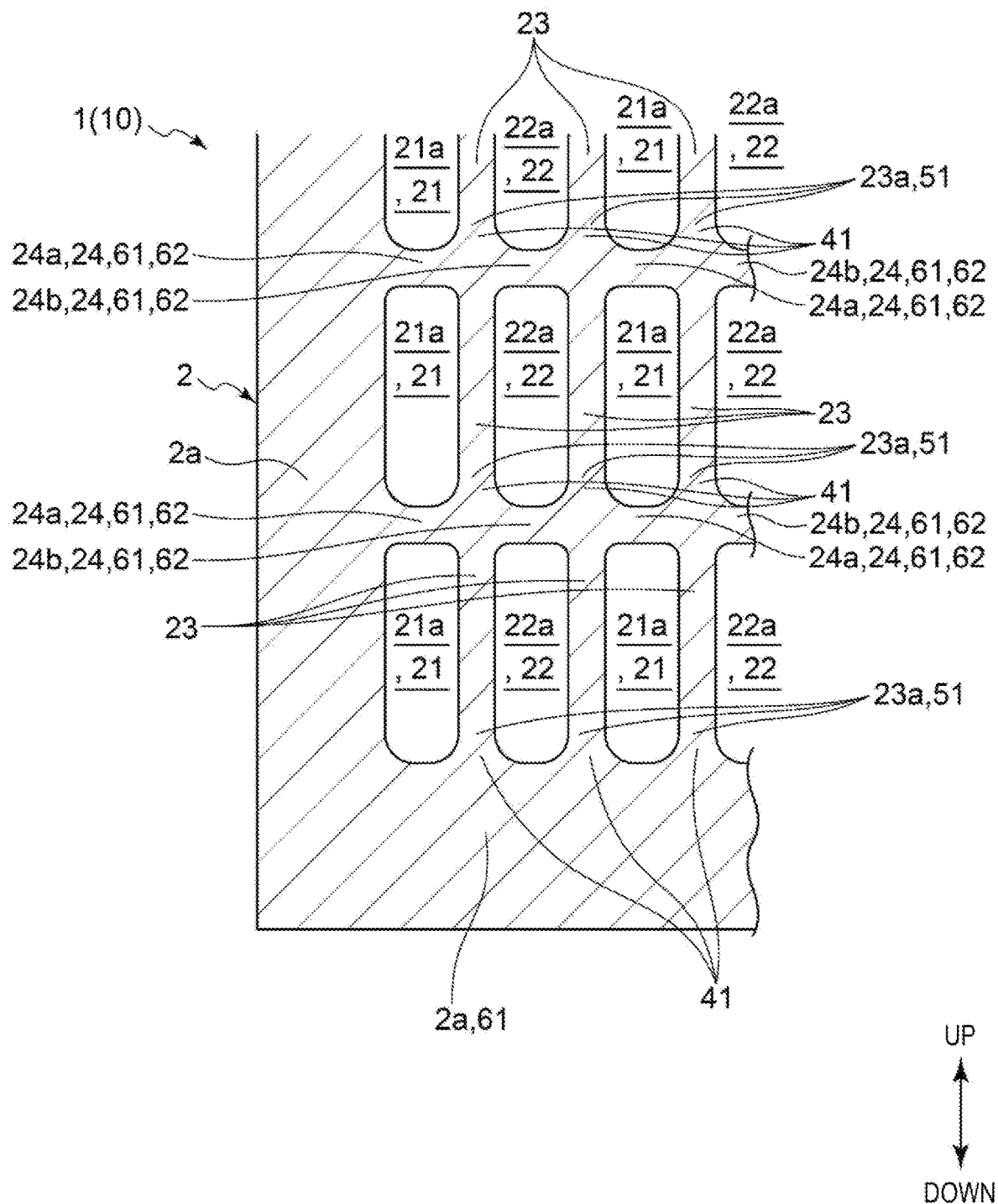
FIG. 2 is an example of a schematic view illustrating a cut surface cut along a dashed line L1 in FIG. 1.

FIG. 2 is an example of a schematic view illustrating a cut surface cut along a dashed line L1 of FIG. 1.

Figure 3:
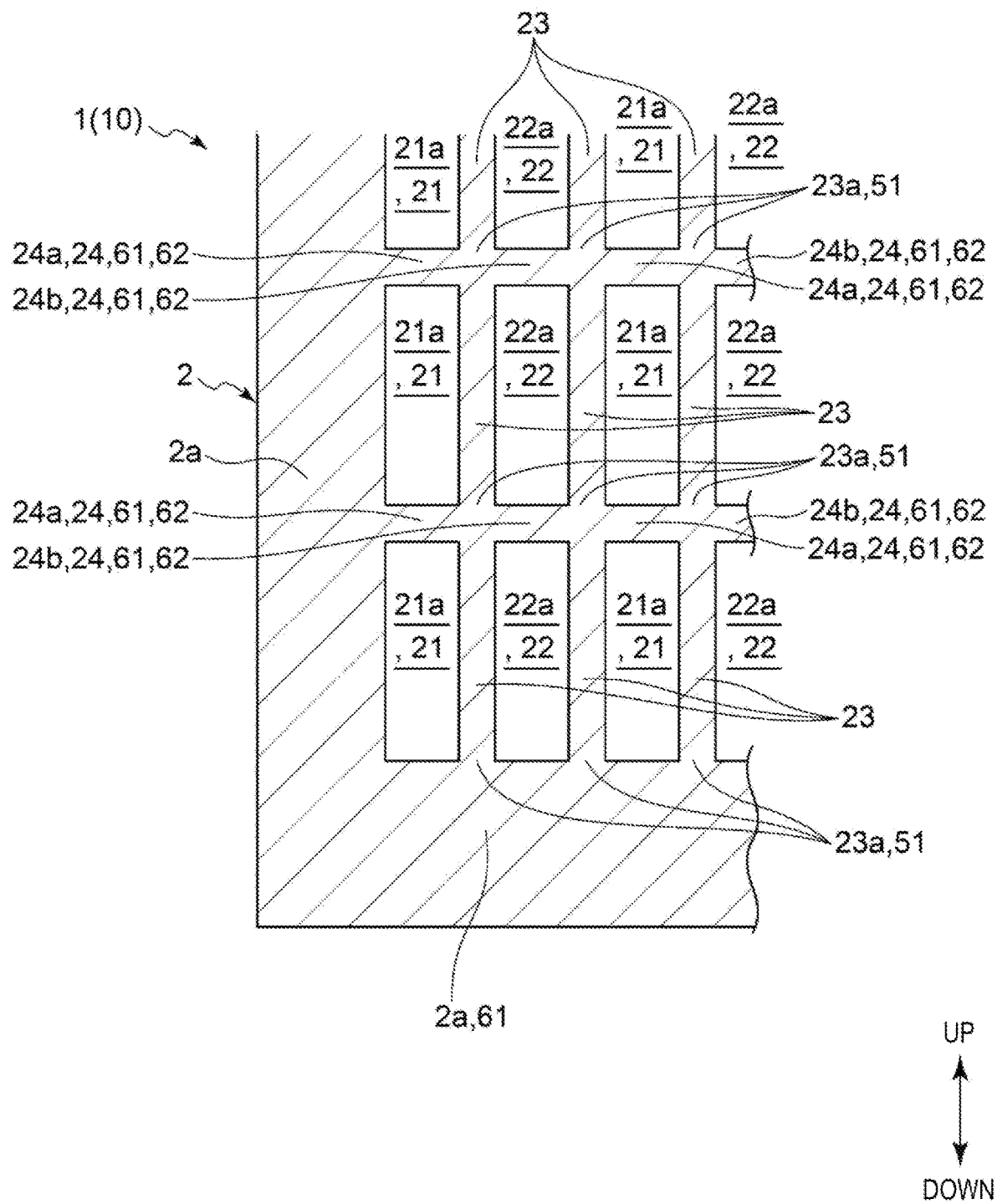
FIG. 3 is another example of a schematic view illustrating the cut surface cut along the dashed line L1 in FIG. 1.

FIG. 3 is another example of a schematic view illustrating the cut surface cut along the dashed line L1 of FIG. 1.

Figure 4:
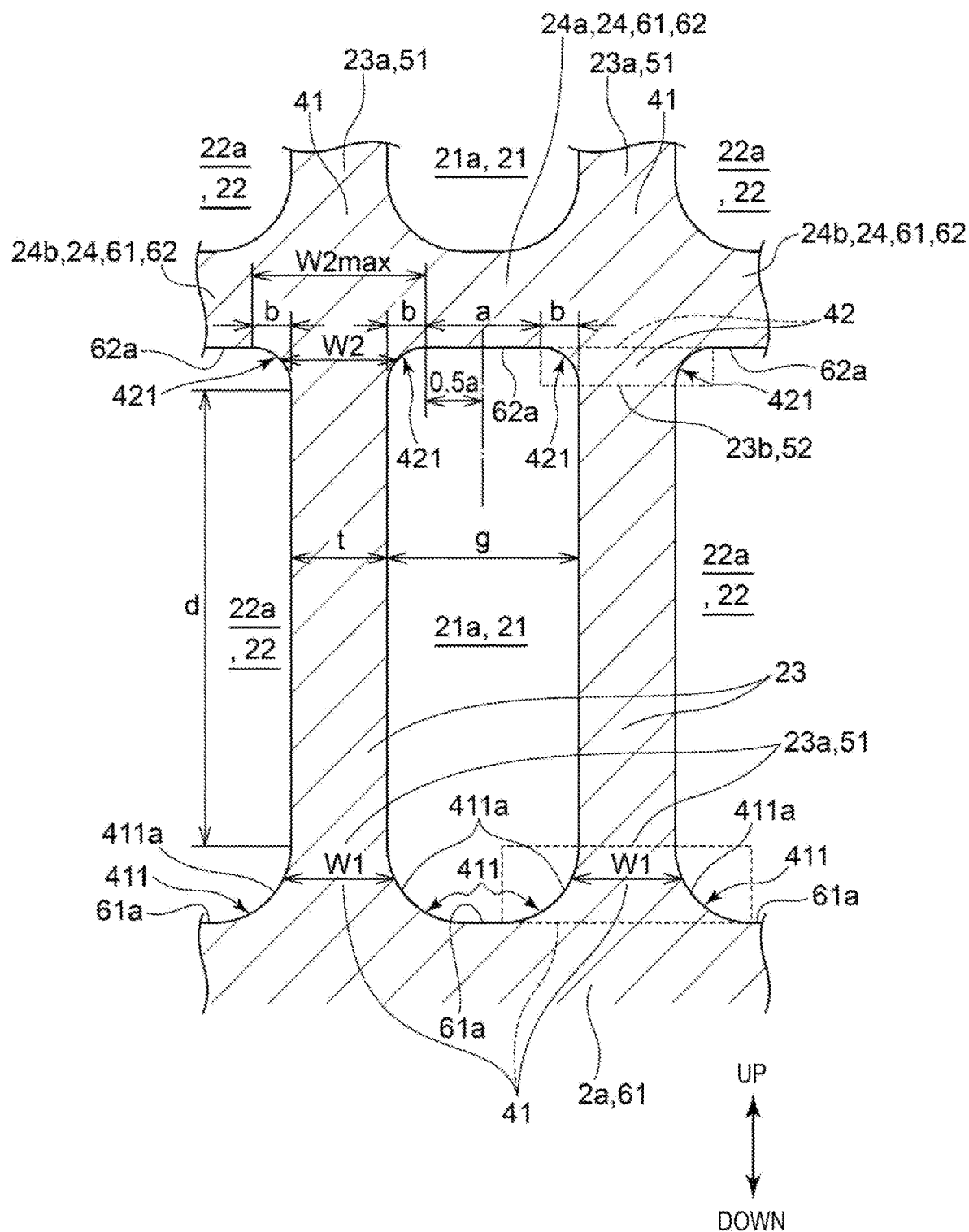
FIG. 4 is a partially enlarged view of FIG. 2.

FIG. 4 is a partially enlarged view of FIG. 2.

Note that the heat exchange core 1 cut along the cut surface illustrated in FIGS. 2 and 4 and the heat exchange core 1 cut along the cut surface illustrated in FIG. 3 differ from each other in terms of, for example, a layering direction of additive manufacturing.

As illustrated in FIGS. 2 to 4, heat exchange flow paths for exchanging heat inside the heat exchanger 10 (heat exchange core 1) are formed in the main body portion 2 according to the embodiment, the heat exchange flow paths being mainly first flow paths 21 through which the first fluid flows and second flow paths 22 through which the second fluid flows. The first flow paths 21 and the second flow paths 22 are each formed so as to extend along a longitudinal direction of the main body portion 2 (a direction perpendicular to the page surfaces of FIGS. 2 to 4). The first flow paths 21 and the second flow paths 22 are alternately arranged in a direction perpendicular to the longitudinal direction of the main body portion 2. The first flow paths 21 and the second flow paths 22 adjacent to each other are separated by partition walls (wall portions) 23. Note that the number of each of the first flow paths 21 and the second flow paths 22, that is, the number of wall portions 23, is not limited to the number illustrated in FIGS. 2 and 3, and can be set to any number.

Each of the first flow paths 21 and the second flow paths 22 may be respectively partitioned into a plurality of divided flow paths 21a and 22a by a plurality of first and second compartment walls 24a and 24b. In this case, the number of divided flow paths 21a and the number of divided flow paths 22a, that is, the number of first compartment walls 24a and the number of second compartment walls 24b, are not limited to the numbers illustrated in FIGS. 2 and 3, and can be set to any number.

Note that, in the following description, in a case where the first compartment walls 24a and the second compartment walls 24b do not need to be particularly distinguished from each other, the first compartment walls 24a and the second compartment walls 24b, including the wall portions present therebetween, are simply referred to as compartment walls 24.

As illustrated in FIG. 1, the heat exchange core 1 according to the embodiment is provided with a first fluid first header flow path 4, a first fluid second header flow path 5, a second fluid first header flow path 6, and a second fluid second header flow path 7.

The first fluid first header flow path 4 communicates with an upper end portion (illustrated in FIG. 1) of each first flow path 21. The first fluid second header flow path 5 communicates with a lower end portion (illustrated in FIG. 1) of each first flow path 21.

The second fluid first header flow path 6 communicates with an upper end portion (illustrated in FIG. 1) of each second flow path 22. The second fluid second header flow path 7 communicates with a lower end portion (illustrated in FIG. 1) of each second flow path 22.

In the example illustrated in FIG. 1, header portions 8 and 9 are provided at end portions on one side and the other side of the main body portion 2 in the longitudinal direction.

In the heat exchange core 1 according to one embodiment illustrated in FIG. 1, the fluid supplied to either one of the first fluid first header flow path 4 and the first fluid second header flow path 5 is discharged from the other one of the first fluid first header flow path 4 and the first fluid second header flow path 5 after flowing through each first flow path 21.

Similarly, in the heat exchange core 1 according to one embodiment illustrated in FIG. 1, the fluid supplied to either one of the second fluid first header flow path 6 and the second fluid second header flow path 7 is discharged from the other one of the second fluid first header flow path 6 and the second fluid second header flow path 7 after flowing through each second flow path 22.

In the heat exchange core 1 according to one embodiment illustrated in FIG. 1, the fluid flowing through the first flow paths 21 and the fluid flowing through the second flow paths 22 exchange heat via the wall portions 23.

Of the heat exchange core 1 according to one embodiment illustrated in FIG. 1, it is difficult to manufacture the main body portion 2 by layering or casting plates, due to the complexity of the configuration of the main body portion 2. Therefore, it is preferred that the main body portion 2 be manufactured by additive manufacturing of a metal powder used as a raw material. In this case, the main body portion 2 is an additive manufactured body of the metal powder. Although the metal powder used in the additive manufacturing of the main body portion 2 is not particularly limited, stainless steel powder, titanium powder or the like can be used.

For example, in FIGS. 2 and 4, an up-down direction is taken as the layering direction of additive manufacturing, in which the material is layered from the bottom of the drawings to the top of the drawings to form the heat exchange core 1 as an additive manufactured object.

In this case, after forming a side wall portion 2a illustrated in the lower part of the drawing, which is one of side wall portions 2a of the main body portion 2, each of the wall portions 23 is layered with respect to said formed side wall portion 2a.

When forming the heat exchange core 1 according to one embodiment illustrated in FIG. 1 by an additive manufacturing method using a powder bed method, after the side wall portion 2a illustrated in the lower part of FIGS. 2 and 4 is formed, the raw material powder is layered in layers on a top surface of the side wall portion 2a, and then regions of the layered raw material powder that correspond to the wall portions 23 are irradiated with an energy beam to melt and solidify the raw material powder.

Note that the particle size of the raw material powder may be, for example, 5 µm or greater and 100µ or less on average, and preferably 10 μm or greater and 45μ or less on average. In addition, the thickness of the layered layers of the raw material powder is generally 0.03 mm or more and 0.07 mm or less per layer. In a case where the energy beam is a laser beam, the spot diameter thereof is generally approximately 0.08 mm.

In this case, the size of the side wall portion 2a in a left-right direction illustrated in the drawings is greater than the thickness of the wall portion 23, that is, the size of the wall portion 23 in the left-right direction, and the difference in size between these two parts in the left-right direction is relatively large. Thus, the heat introduced into the powder bed by the energy beam escapes to the side wall portion 2a, possibly causing insufficient melting of the metal powder in the region corresponding to the wall portion 23.

A similar phenomenon can occur when forming the wall portion 23 on top of the compartment wall 24.

Such insufficient melting lowers the quality of the heat exchange core 1 as an additive manufactured object, and in some cases may lead to defects such as fluid leakage due to poor formation of the wall portion 23.

Therefore, in the heat exchange core 1 according to some embodiments, an end portion 23a of each of the wall portions 23 in each of the divided flow paths 21a and 22a, the end portion 23a being illustrated in the lower part of the drawings, is connected to the side wall portion 2a or the compartment wall 24 via a first connection portion 41 having a width greater than the thickness of the wall portion 23 in the wall thickness direction. In other words, when the end portion 23a of each wall portion 23 that is illustrated in the lower part of the drawings is taken as a first end portion 51, and the side wall portion 2a or compartment wall 24 illustrated in the lower part of FIGS. 2 and 4 is taken as a first base portion 61, the heat exchange core 1 according to some embodiments includes the following features.

The heat exchange core 1 according to some embodiments includes the first base portion 61 made of metal and the plurality of wall portions 23 each having a thickness t thinner than the first base portion 61 and provided upright on the first base portion 61 so as to be aligned in the wall thickness direction. The first end portion 51 of each wall portion 23 is connected to the first base portion 61 via the first connection portion 41 having a width W1 greater than the thickness t of each of the wall portions 23 in the wall thickness direction.

Note that, in FIG. 4, for the purpose of facilitating understanding, the range where the first connection portion 41 is present is represented as a dashed-line rectangle.

In the heat exchange core 1 according to some embodiments, the first connection portion 41 includes a fillet portion 411 illustrated in, for example, FIGS. 2 and 4, which is a part connecting the side wall portion 2a or compartment wall 24 illustrated in the lower part of FIGS. 2 and 4 to each wall portion 23 (see FIG. 4).

When viewed from the first flow path 21 and the second flow path 22, the fillet portion 411 illustrated in FIGS. 2 and 4 includes a concave surface 411a that is recessed toward the inner side of the side wall portion 2a or compartment wall 24 and the inner side of the wall portion 23.

Therefore, since the width of the first connection portion 41 in the wall thickness direction is greater than that of the wall portion 23 (t<W1), insufficient melting of the raw material powder is less likely to occur as compared to when the first base portion 61 and the first end portion 51 are connected without having the first connection portion 41 therebetween, as illustrated in FIG. 3. Specifically, since the total amount of heat entering the part connected to the first base portion 61 (i.e., the first connection portion 41) increases, insufficient melting of the raw material powder is less likely to occur even if the heat introduced into the powder bed by the energy beam escapes to the first base portion 61 during the formation of the part.

According to the heat exchange core 1 according to some embodiments, since insufficient melting of the raw material powder during additive manufacturing can be suppressed, the quality of the heat exchange core 1 that is the additive manufactured object can be improved.

The above-described insufficient melting of the raw material powder during additive manufacturing is particularly problematic when, for example, the thickness t of the wall portion 23 in the wall thickness direction is 0.5 mm or less and the size of the first base portion 61 in said wall thickness direction is equal to or greater than 10 times the thickness t of the wall portion 23 in the wall thickness direction (referred to as condition A). In order to satisfy this condition A, the first end portion 51 of each wall portion 23 is preferably connected to the first base portion 61 via the first connection portion 41 having the width W1 greater than the thickness t of the wall portion 23 in the wall thickness direction, as described above.

FIGS. 5A to 7C are each a diagram illustrating an example of a variation of the fillet portion 411.

Figure 5A:
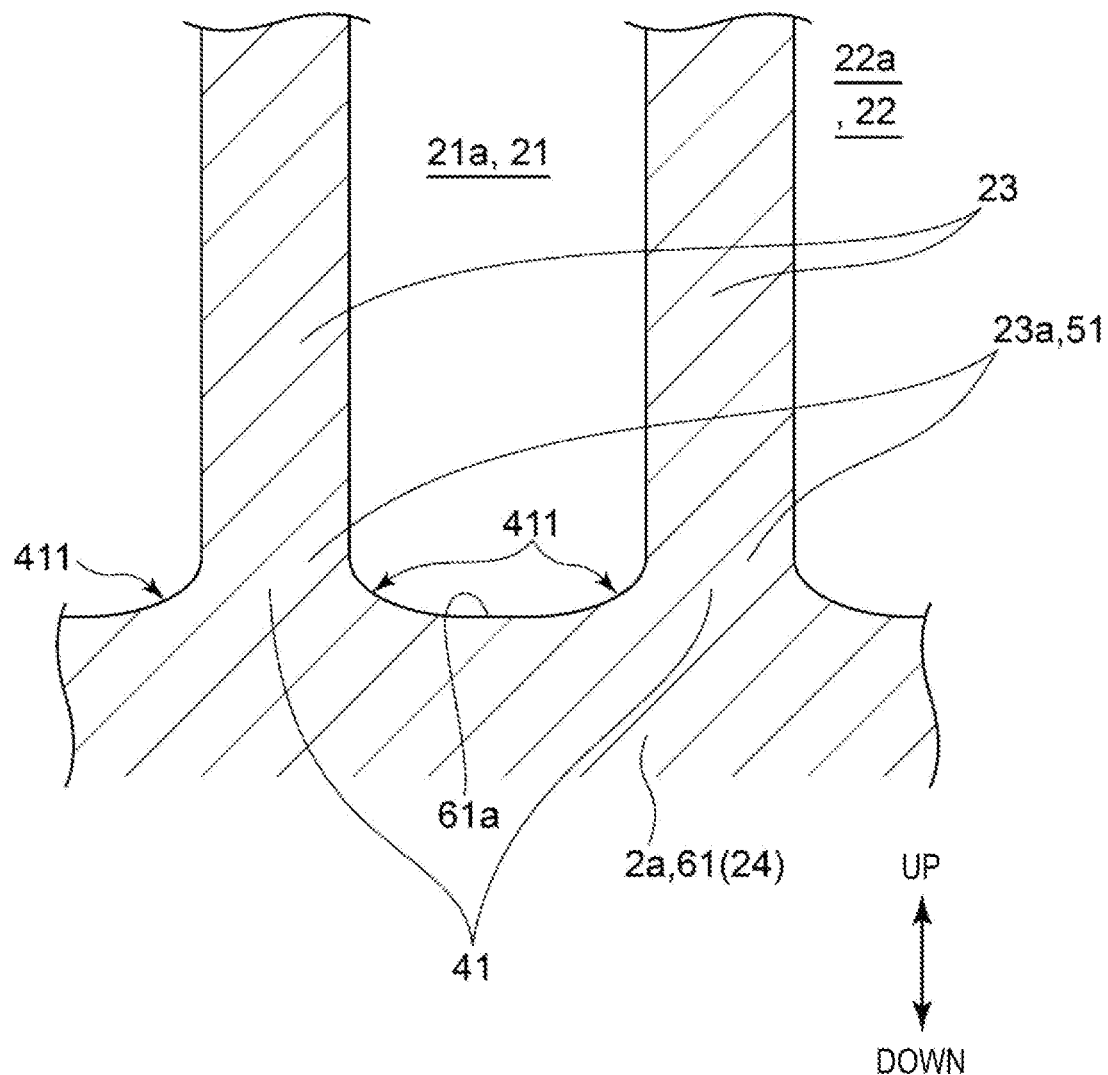
FIG. 5A is a diagram illustrating an example of a variation of a fillet portion.

For example, as illustrated in FIG. 5A, the fillet portion 411 may have a larger dimension in a width direction (the left-right direction illustrated in the drawings) than in a height direction (the up-down direction illustrated in the drawings).

Figure 5B:
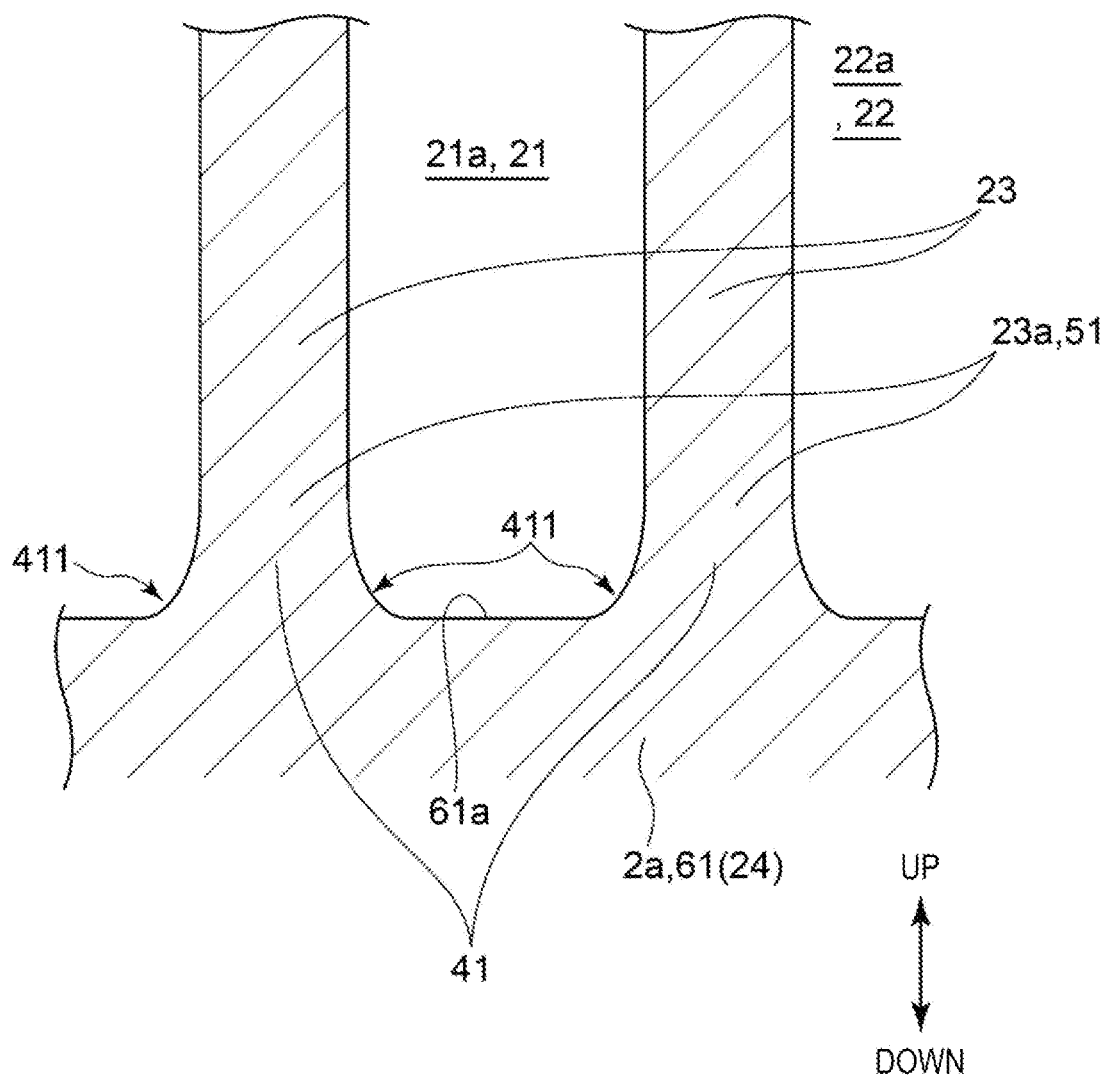
FIG. 5B is a diagram illustrating an example of a variation of the fillet portion.

Furthermore, for example, as illustrated in FIG. 5B, the fillet portion 411 may have a smaller dimension in the width direction (the left-right direction illustrated in the drawings) than in the height direction (the up-down direction illustrated in the drawings).

Figure 6:
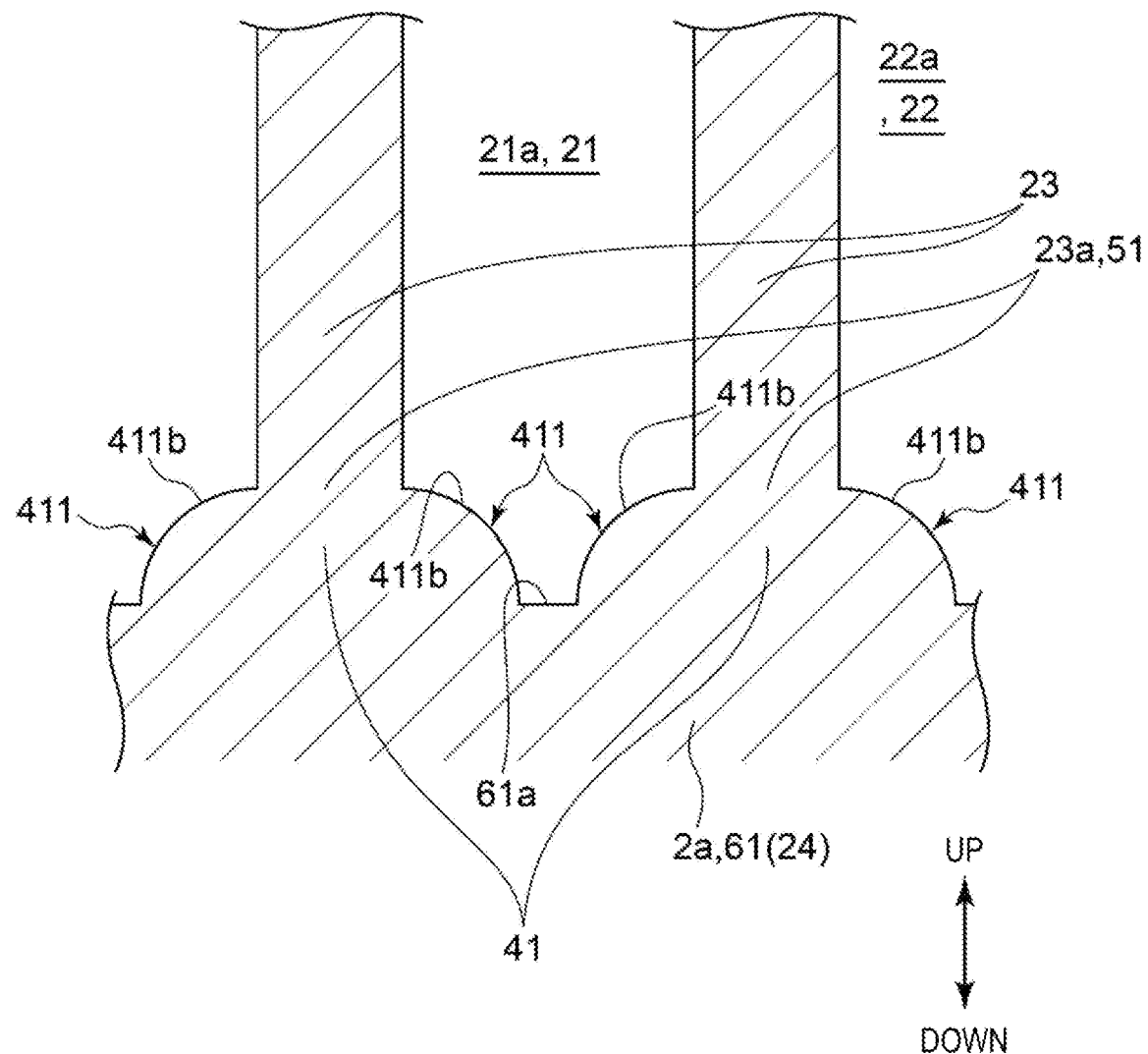
FIG. 6 is a diagram illustrating an example of a variation of the fillet portion.

For example, as illustrated in FIG. 6, when viewed from the first flow path 21 and the second flow path 22, the fillet portion 411 may include a protruding surface 411b protruding toward the inner side of the side wall portion 2a or compartment wall 24 and the inner side of the wall portion 23.

Figure 7A:
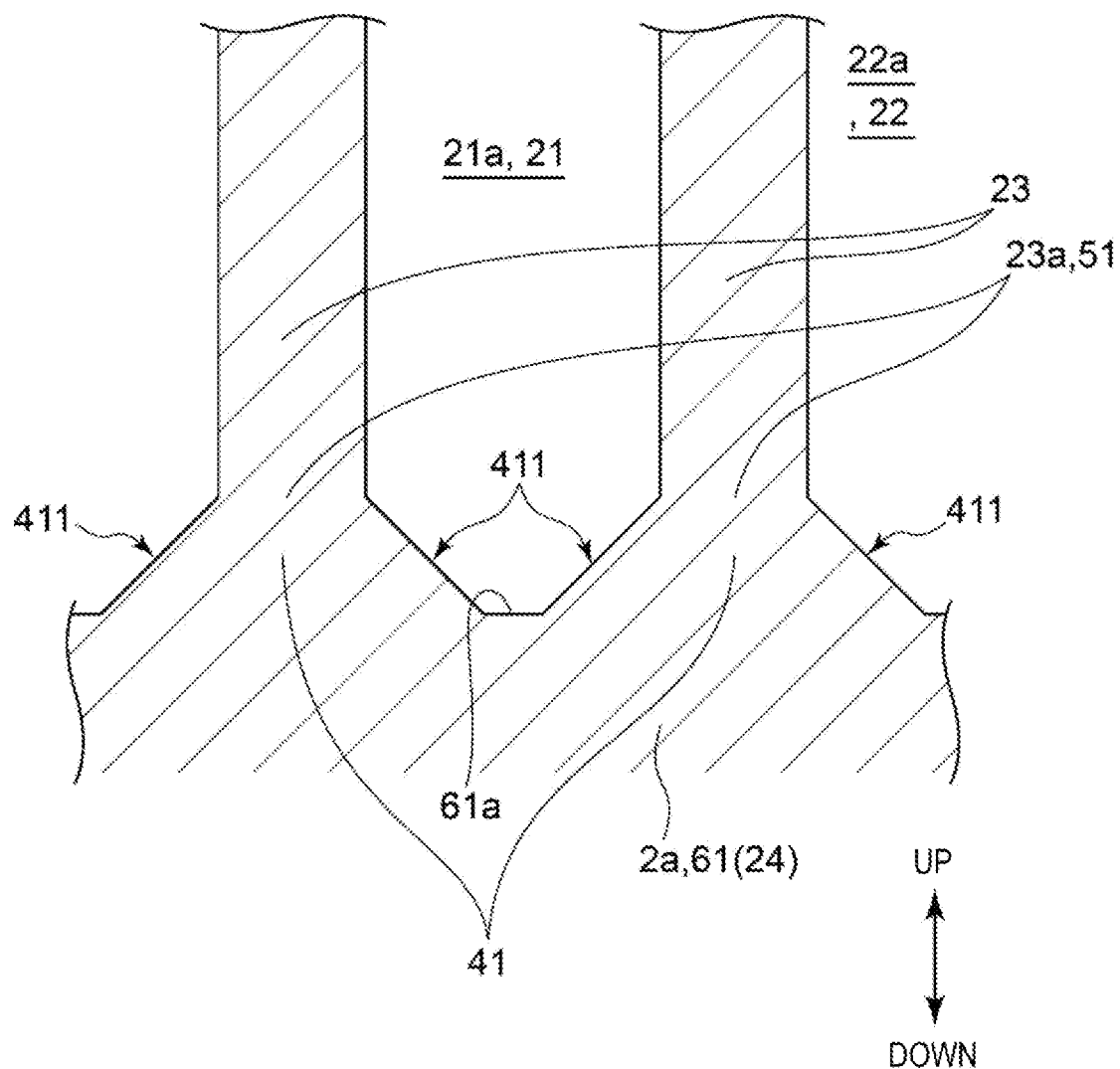
FIG. 7A is a diagram illustrating an example of a variation of the fillet portion.
Figure 7B:
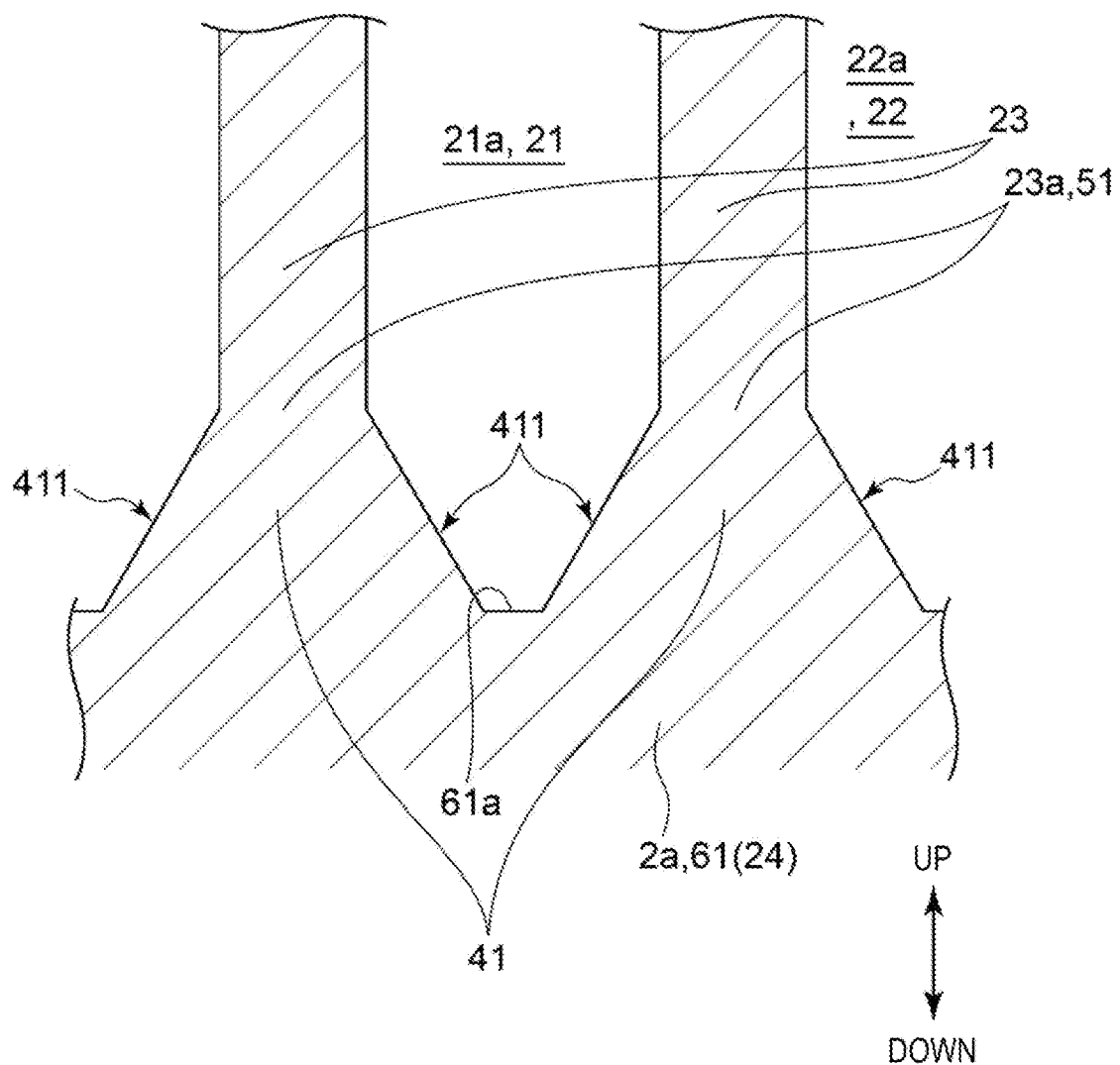
FIG. 7B is a diagram illustrating an example of a variation of the fillet portion.
Figure 7C:
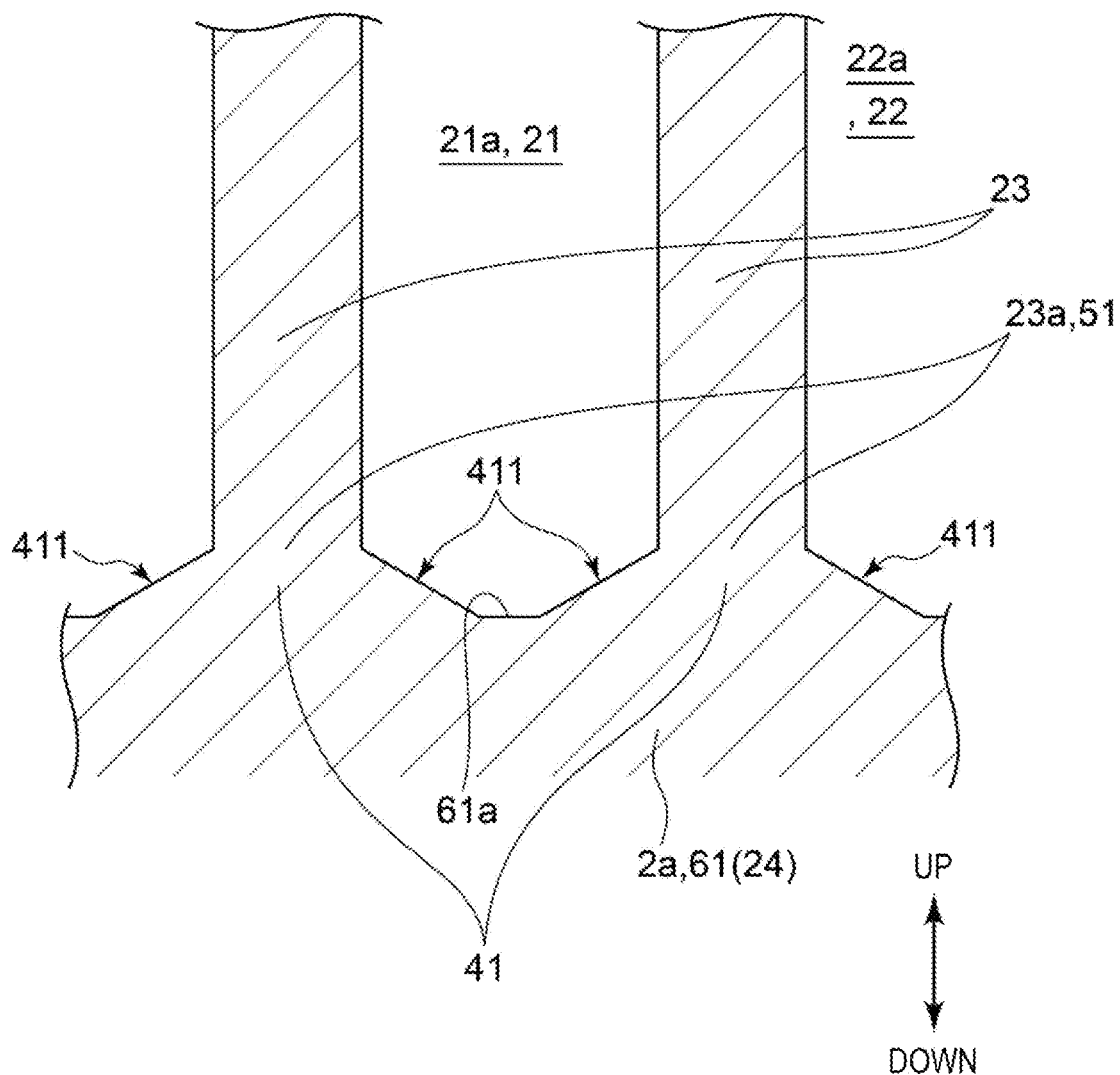
FIG. 7C is a diagram illustrating an example of a variation of the fillet portion.

For example, as illustrated in FIGS. 7A to 7C, the fillet portion 411 may have a flat beveled surface.

Note that, as illustrated in FIG. 7A, the dimension of the fillet portion 411 in the height direction (the up-down direction illustrated in the drawings) may be equal to the dimension of the fillet portion 411 in the width direction (the left-right direction illustrated in the drawings).

In addition, as illustrated in FIG. 7B, the fillet portion 411 may have a smaller dimension in the width direction (the left-right direction illustrated in the drawings) than in the height direction (the up-down direction illustrated in the drawings).

Moreover, as illustrated in FIG. 7C, the fillet portion 411 may have a larger dimension in the width direction (the left-right direction illustrated in the drawings) than in the height direction (the up-down direction illustrated in the drawings).

Examples of the variations of the fillet portion 411 illustrated in FIGS. 5A to 7C may be applied to a fillet portion 421 of a second connection portion 42 that is described hereinafter.

Note that, in FIG. 3 for example, in a case where the heat exchange core 1 is formed as an additive manufactured object, with a depth direction of the page surface taken as the layering direction of additive manufacturing, the first connection portion 41 and the second connection portion 42 described above do not have to be provided, as illustrated in FIG. 3.

In the heat exchange core 1 according to some embodiments, an end portion 23b of each wall portion 23 in each of the divided flow paths 21a and 22a, the end portion 23 being illustrated in the upper part of the drawings (see FIG. 4), may be connected to the compartment wall 24 or the upper side wall portion 2a (not illustrated) via the second connection portion 42 (see FIG. 4) having a smaller width in the wall thickness direction than the first connection portion 41. In other words, when the end portion 23b of each wall portion 23 that is illustrated in the upper part of the drawings is taken as a second end portion 52 (see FIG. 4), and the compartment wall 24 of FIGS. 2 and 4 or the upper side wall portion 2a (not illustrated) is taken as a second base portion 62, the heat exchange core 1 according to some embodiments includes the following features.

The heat exchange core 1 according to some embodiments may include the second base portion 62 to which the second end portion 52 on the opposite side of the first end portion 51 of each wall portion 23 is connected via the second connection portion 42. The second connection portion 42 may have a width smaller in the wall thickness direction than the width of the first connection portion 41. In other words, a width W2 of the second connection portion 42 in the wall thickness direction may be smaller than the width W1 of the first connection portion 41 in the wall thickness direction.

Note that, in FIG. 4, for the purpose of facilitating understanding, the range where the second connection portion 42 is present is represented as a dashed-line rectangle.

Note that, as illustrated in FIG. 4 for example, focusing on one compartment wall 24, the compartment wall 24 corresponds to the second base portion 62 in relation to the wall portion 23 below the compartment wall 24, and corresponds to the first base portion 61 in relation to the wall portion 23 above the compartment wall 24.

In the heat exchange core 1 according to some embodiments, the second connection portion 42 may include the fillet portion 421 (see FIG. 4) illustrated in, for example, FIGS. 2 and 4, which is a part where the compartment wall 24 or upper side wall portion 2a in FIGS. 2 and 4 is connected to each wall portion 23.

The shape of the fillet portion 421 illustrated in FIGS. 2 and 4 may be similar to that of the fillet portion 411 of the first connection portion 41 illustrated in FIG. 4 or may be the shape as in the example of the variation of the fillet portion 411 illustrated in FIGS. 5A to 7C.

Note that the fillet portion 421 of the second connection portion 42 may be formed unintentionally in additive manufacturing, that is, formed as a result of sagging of the corner of the intersection between the compartment wall 24 or the side wall portion 2a (not illustrated) and each wall portion 23.

A space surrounded by two wall portions 23 adjacent to each other in the wall thickness direction, the first base portion 61, and the second base portion 62 is formed in the heat exchange core 1 according to some embodiments. In the heat exchange core 1 according to some embodiments, this space is the divided flow path 21a of the first flow path 21 and the divided flow path 22a of the second flow path 22.

In the heat exchange core 1 according to some embodiments, in some cases the size of the space is preferably large, as in the case where the space functions as a flow path through which a fluid flows.

However, if the width W1 of the first connection portion 41 in the wall thickness direction and the width W2 of the second connection portion 42 in the wall thickness direction increase, the size of the space decreases.

As described above, from the perspective of suppressing insufficient melting of the raw material powder during additive manufacturing, it is preferred that the width W1 of the first connection portion 41 in the wall thickness direction be secured to some extent. However, there is little need to secure the width W2 of the second connection portion 42 in the wall thickness direction. That is, for example, in a case where the heat exchange core 1 according to some embodiments is formed by layering the raw material powder from the first base portion 61 toward the wall portion 23 by means of an additive manufacturing method using a powder bed method, the second base portion 62 is formed on the second connection portion 42. In this case, even if the heat introduced into the powder bed by the energy beam escapes to the second connection portion 42 at the time of the formation of the second base portion 62, the amount of heat escaping becomes relatively small because the size of the second connection portion 42 is relatively small, reducing the likelihood of insufficient melting of the raw material powder.

Accordingly, the width W2 of the second connection portion 42 in the wall thickness direction may be smaller than the width W1 of the first connection portion 41 in the wall thickness direction. Making the width W2 of the second connection portion 42 in the wall thickness direction smaller than the width W1 of the first connection portion 41 in the wall thickness direction (W2<W1) can prevent a reduction in the size of the space surrounded by the wall portions 23 adjacent to each other in the wall thickness direction, the first base portion 61, and the second base portion 62, that is, the size of the divided flow paths 21a, 22a.

When making the width W2 of the second connection portion 42 in the wall thickness direction smaller than the width W1 of the first connection portion 41 in the wall thickness direction, a size a of a roof surface of the second base portion 62 in the wall thickness direction that faces the divided flow paths 21a, 22a (a second surface 62a to be described later) may be made greater than the sum of maximum widths b of the two fillet portions 421 of the second connection portion 42 in one of the divided flow paths 21a, 22a (2×b).

That is, Formula (1) below is preferably satisfied.

$$2 \times b < a \tag{1}$$

Note that in the heat exchange core 1 according to some embodiments, the size a of the second surface 62a in the wall thickness direction in one of the divided flow paths 21a, 22a is 3 mm or less.

Additionally, in the heat exchange core 1 according to some embodiments, the maximum widths b of the fillet portions 421 is preferably approximately 500 μm.

From Formula (1) above, a relational expression among a maximum value W2max of the width of the second connection portion 42 in the wall thickness direction, a gap g between a pair of wall portions 23 adjacent to each other in the wall thickness direction, and the thickness t of each wall portion 23 is derived as follows.

First, when 2×b is added to both sides of Formula (1), 4×b<a+2×b (2) is obtained.

As is clear from FIG. 4, since g=a+2×b, Formula (3) below is derived from Formula (2) above.

$$4 \times b < g$$

$$2 \times b < 0.5 \times g \tag{3}$$

In addition, as illustrated in FIG. 4, the maximum value W2max of the width of the second connection portion in the wall thickness direction is the sum of the sum of the maximum widths b of the fillet portions 421 (2×b) and the thickness t of the wall portion 23. Thus, Formula (4) below is obtained.

$$W2\max = 2 \times b + t$$

$$W2\max - t = 2 \times b \tag{4}$$

By substituting Formula (4) above into the left side of Formula (3) above, Formula (5) below is obtained as a relational expression among the maximum value W2max of the width W2 of the second connection portion 42 in the wall thickness direction, the gap g between the pair of wall portions 23 adjacent to each other in the wall thickness direction, and the thickness t of each wall portion 23.

$$W2\max - t < 0.5 \times g \tag{5}$$

Specifically, in the heat exchange core 1 according to some embodiments, the maximum value W2max of the width W2 of the second connection portion 42 in the wall thickness direction, the gap g between the pair of wall portions 23 adjacent to each other in the wall thickness direction, and the thickness t of each wall portion 23 preferably satisfy Formula (5) above.

As a result, within the second base portion 62, the size a of the second surface 62a in the wall thickness direction described later can be made greater than the total amount of protrusion (maximum widths b) (2×b) of the second connection portions 42 in the wall thickness direction from the respective two wall portions 23 adjacent to each other in the wall thickness direction with the divided flow paths 21a, 22a therebetween. Accordingly, the size of the divided flow paths 21a, 22a can be prevented from becoming small.

In the heat exchange core 1 according to some embodiments, the second surface 62a of the second base portion 62 to which the second end portion 52 of each wall portion 23 is connected via the second connection portion 42 may have a greater surface roughness than the first surface 61a of the first base portion 61 to which the first end portion 51 of each wall portion 23 is connected via the first connection portion 41.

For example, in a case where the heat exchange core 1 according to some embodiments is formed by layering the raw material powder from the first base portion 61 toward the wall portion 23 by means of an additive manufacturing method using a powder bed method, the region in the second base portion 62 that is located between two wall portions 23 adjacent to each other in the wall thickness direction with the divided flow paths 21a, 22a therebetween, becomes a so-called overhang region. Therefore, when forming the second base portion 62, unintentional attachment of the raw material powder to the second surface 62a is likely to make the surface roughness of the second surface 62a greater than that of the first surface 61a.

Thus, as in the heat exchange core 1 according to some embodiments, the surface roughness of the second surface 62a may be greater than that of the first surface 61a.

In the heat exchange core 1 according to some embodiments, a distance d from the first connection portion 41 to the second connection portion 42 in the direction orthogonal to the wall thickness direction and the gap g between the pair of wall portions 23 adjacent to each other in the wall thickness direction preferably satisfy Formula (6) below.

$$d > g \tag{6}$$

As a result, the size of the divided flow paths 21a, 22a in the direction orthogonal to the wall thickness direction becomes greater than the thickness in the wall thickness direction, and a flow path cross-sectional area of the divided flow paths 21a, 22a can be increased while suppressing the expansion of the overhang region.

The present disclosure is not limited to the above-described embodiments, and includes embodiments obtained by modifying the above-described embodiments and embodiments obtained by appropriately combining these embodiments.

For example, in the foregoing description, although the relationship between the first surface 61a of the first base portion 61 and the extending direction of each wall portion 23 is not explicitly mentioned, each wall portion 23 may extend in a direction orthogonal to the first surface 61a of the first base portion 61, or each wall portion 23 may extend in a direction inclined with respect to the first surface 61a of the first base portion 61.

Furthermore, for example, in the foregoing description, the heat exchange core 1 has been described as an example of the additive manufactured object, but the present disclosure is not limited to the heat exchange core 1; the contents described above can also be applied to various types of additive manufactured objects having a part corresponding to the first base portion 61 made of a metal and parts corresponding to the plurality of wall portions 23 each having the thickness t thinner than the first base portion 61 and provided upright on the first base portion 61 so as to be aligned in the wall thickness direction.

The contents described in each of the above embodiments are understood as follows, for example.

(1) The heat exchange core 1 as an additive manufactured object according to at least one embodiment of the present disclosure includes the first base portion 61 made of a metal and the plurality of wall portions 23 each having the thickness t thinner than the first base portion 61 and provided upright on the first base portion 61 so as to be aligned in the wall thickness direction. The first end portion 51 of each wall portion 23 is connected to the first base portion 61 via the first connection portion 41 having the width W1 greater than the thickness t of each of the wall portions 23 in the wall thickness direction.

For example, consider a case in which the additive manufactured object is formed by layering the raw material powder from the first base portion toward the wall portion by an additive manufacturing method using a powder bed method.

In this case, since the width of the first connection portion 41 in the wall thickness direction is greater than the width of the wall portion 23 in the wall thickness direction, insufficient melting of the metal powder (raw material powder) is less likely to occur as compared to when the first base portion 61 and the first end portion 51 are connected without having the first connection portion 41 therebetween. Specifically, since the total amount of heat entering the part connected to the first base portion 61 (i.e., the first connection portion 41) increases, insufficient melting of the raw material powder is less likely to occur even if the heat introduced into the powder bed by the energy beam escapes to the first base portion 61 during the formation of the part.

According to the configuration (1) described above, insufficient melting of the raw material powder during additive manufacturing can be suppressed. Thus, the quality of the additive manufactured object can be improved.

(2) In some embodiments, the configuration (1) described above may include the second base portion 62 to which the second end portion 52 on the opposite side of the first end portion 51 of each of the wall portions 23 is connected via the second connection portion 42. The second connection portion 42 may have a width smaller in the wall thickness direction than the width of the first connection portion 41.

According to the configuration (2) described above, the size of the space surrounded by two wall portions 23 adjacent to each other in the wall thickness direction, the first base portion 61, and the second base portion 62 can be prevented from becoming small.

(3) In some embodiments, according to the configuration (2) described above, the maximum value W2max of the width W2 of the second connection portion 42 in the wall thickness direction, the gap g between the pair of wall portions 23 adjacent to each other in the wall thickness direction, and the thickness t of each of the wall portions satisfy Formula (5).

$$W2\text{max}-t<0.5\times g \quad (5)$$

According to the configuration (3) described above, within the second base portion 62, the size of the roof surface (second surface 62a) in the wall thickness direction that faces said space can be made greater than the total amount of protrusion (maximum widths b) (2×b) of the second connection portions 42 from the two wall portions 23 adjacent to each other in the wall thickness direction with said space therebetween.

(4) In some embodiments, according to the configuration (2) or (3) described above, the second surface 62a of the second base portion 62 to which the second end portion 52 of each of the wall portions 23 is connected via the second connection portion 42 may have a greater surface roughness than the first surface 61a of the first base portion 61 to which the first end portion 51 of each of the wall portions 23 is connected via the first connection portion 41.

For example, in a case where the heat exchange core 1 as the additive manufactured object is formed by layering the raw material powder from the first base portion 61 toward the wall portions 23 by means of an additive manufacturing method using a powder bed method, the region within the second base portion 62 that is located between two wall portions 23 adjacent to each other in the wall thickness direction with said space therebetween becomes a so-called overhang region. Therefore, when forming the second base portion 62, unintentional attachment of the raw material powder to the second surface 62a is likely to make the surface roughness of the second surface 62a greater than that of the first surface 61a.

Thus, as in the configuration (4), the surface roughness of the second surface 62a may be greater than that of the first surface 61a.

(5) In some embodiments, according to any one of the configurations (2) to (4) described above, the distance d from the first connection portion 41 to the second connection portion 42 in the direction orthogonal to the wall thickness direction and the gap g between the pair of wall portions 23 adjacent to each other in the wall thickness direction preferably satisfy Formula (6).

$$d>g \quad (6)$$

According to the configuration (5) described above, the size of the space in the direction orthogonal to the wall thickness direction can be made greater than the thickness in the wall thickness direction, so the space can be increased while suppressing expansion of the overhang region.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. An additive manufactured object, comprising:
a first base portion made of a metal; and
a plurality of wall portions each having a thickness thinner than the first base portion and provided upright on the first base portion so as to be aligned in a wall thickness direction,
a first end portion of each wall portion of the plurality of wall portions being connected to the first base portion via a first connection portion having a width greater than the thickness of each wall portion of the plurality of wall portions in the wall thickness direction,
wherein the additive manufactured object further comprises a second base portion to which a second end portion on an opposite side of the first end portion of each wall portion of the plurality of wall portions is connected via a second connection portion,
wherein the second connection portion has a smaller width in the wall thickness direction than the first connection portion,
wherein a maximum value W2max of the width of the second connection portion in the wall thickness direction, a gap g between a pair of the wall portions adjacent to each other in the wall thickness direction, and the thickness t of each wall portion of the plurality of wall portions satisfy $W2\text{max}-t<0.5=g$.

2. The additive manufactured object according to claim 1, wherein a second surface of the second base portion to which the second end portion of each wall portion of the plurality of wall portions is connected via the second connection portion has a greater surface roughness than a first surface of the first base portion to which the first end portion of each wall portion of the plurality of wall portions is connected via the first connection portion.

3. The additive manufactured object according to claim 1, wherein a distance d from the first connection portion to the second connection portion in a direction orthogonal to the wall thickness direction and the gap g between the pair of the wall portions adjacent to each other in the wall thickness direction satisfy $d>g$.

* * * * *